(12) United States Patent
Groppo et al.

(10) Patent No.: US 10,514,494 B2
(45) Date of Patent: Dec. 24, 2019

(54) WAVEGUIDE ASSEMBLY AND ALIGNMENT DESIGN AND INTEGRATION

(71) Applicant: Flex Ltd., Singapore (SG)

(72) Inventors: Robert J. Groppo, Sunnyvale, CA (US); Peter Chester, Sunnyvale, CA (US); Ori Jacobi, Tel Aviv (IL)

(73) Assignee: Flex, Ltd., Singapore (SG)

( * ) Notice: Subject to any disclaimer, the term of this patent is extended or adjusted under 35 U.S.C. 154(b) by 0 days.

(21) Appl. No.: 16/110,985

(22) Filed: Aug. 23, 2018

(65) Prior Publication Data

US 2019/0064430 A1    Feb. 28, 2019

Related U.S. Application Data

(60) Provisional application No. 62/549,075, filed on Aug. 23, 2017.

(51) Int. Cl.
*G02B 6/42* (2006.01)
*F21V 8/00* (2006.01)
*G02B 27/01* (2006.01)

(52) U.S. Cl.
CPC ......... *G02B 6/0088* (2013.01); *G02B 6/0076* (2013.01); *G02B 6/0093* (2013.01); *G02B 27/01* (2013.01); *G02B 27/0172* (2013.01); *G02B 2027/011* (2013.01)

(58) Field of Classification Search
USPC .................................................. 385/33, 129
See application file for complete search history.

(56) References Cited

U.S. PATENT DOCUMENTS

| | | | |
|---|---|---|---|
| 2004/0246391 A1* | 12/2004 | Travis | G02B 27/0081 349/6 |
| 2010/0278480 A1* | 11/2010 | Vasylyev | G02B 3/005 385/33 |
| 2015/0277066 A1* | 10/2015 | Nakagawa | G02B 3/0006 385/33 |
| 2018/0232048 A1* | 8/2018 | Popovich | A61B 3/113 |
| 2018/0275355 A1* | 9/2018 | Haase | G02B 6/32 |

\* cited by examiner

*Primary Examiner* — Eric Wong
(74) *Attorney, Agent, or Firm* — Sheridan Ross P.C.

(57) ABSTRACT

Methods and systems are provided to assemble an optical waveguide assembly. An optical waveguide assembly may be used in a virtual reality headset or other type of projection system. The optical waveguide assembly includes a front lens, one or more optical waveguides, and a back lens. In one embodiment, an insert is used that is the same width as the optical waveguides to prevent cracking of the optical waveguides. In another embodiment, the optical waveguide assembly includes Optically Clear Adhesive (OCA) tape between the different elements of the optical waveguide assembly to precisely align the optical waveguides. In another embodiment, the optical waveguide assembly has cover portions or a frame that protect the optical waveguides in the optical waveguide assembly.

14 Claims, 7 Drawing Sheets

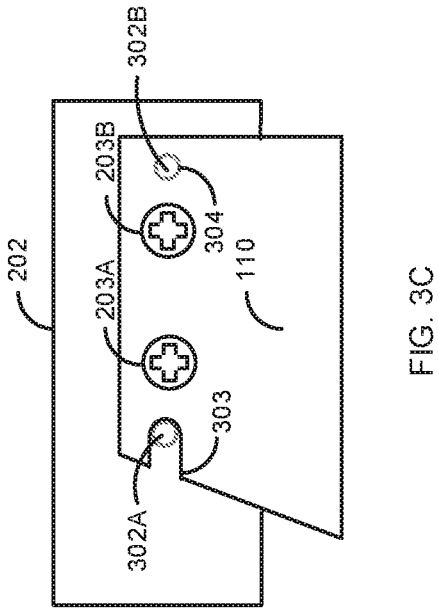
FIG. 3A
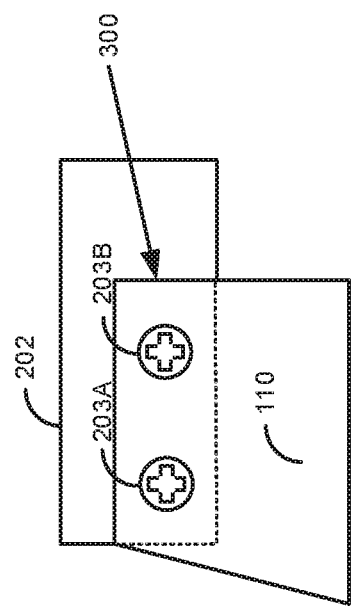
FIG. 3C
FIG. 3B

WAVEGUIDE ASSEMBLY AND ALIGNMENT DESIGN AND INTEGRATION

CROSS REFERENCE TO RELATED APPLICATIONS

The present application claims the benefits of and priority, under 35 U.S.C. § 119(e), to U.S. Provisional Application Ser. No. 62/549,075, filed on Aug. 23, 2017, entitled "Waveguide Assembly and Alignment Design and Integration." The entire disclosures of the application listed above is hereby incorporated by reference, in its entirety, for all that it teaches and for all purposes.

FIELD

The present disclosure is generally directed to waveguide assemblies, in particular, toward optical waveguide assemblies.

BACKGROUND

Optical waveguide assemblies can be used in various ways. One way to use an optical waveguide assembly is in a virtual reality headset. The virtual reality headset relies on optical energy projected from a light projection engine (e.g., a Digital Light Processor (DLP)) onto one side of an optical waveguide. The waveguide then reflects the light (e.g., an image) from the other side to the user. For this process to work properly, the optical waveguide is typically made of glass that includes a series of precision ridges that reflect light at different angles to present a larger image on the optical waveguide to the user. Another alternative is to use an optical waveguide assembly for augmented reality. An augmented reality device is where the optical waveguides are transparent so the projected image is overlaid with reality.

In order for these types of systems to work properly, it is necessary to have precise alignment of the various components. For example, if the light projection engine is not aligned properly with the optical waveguide, the displayed image may become distorted. In some cases, the optical waveguide may include multiple optical waveguides (e.g., that filter different colors). If the different optical waveguides are misaligned from each other, this can also result in a distorted image. In addition, because the optical waveguides are typically made of glass, the optical waveguides can be easily damaged if not properly protected.

BRIEF DESCRIPTION OF THE DRAWINGS

FIG. 3A shows a frame used to mount an optical waveguide assembly in accordance with embodiments of the present disclosure;

FIG. 3B shows a frame with a mounted optical waveguide assembly in accordance with embodiments of the present disclosure;

FIG. 3C shows a frame with a mounted optical waveguide assembly in accordance with embodiments of the present disclosure;

DETAILED DESCRIPTION

Figure 1:
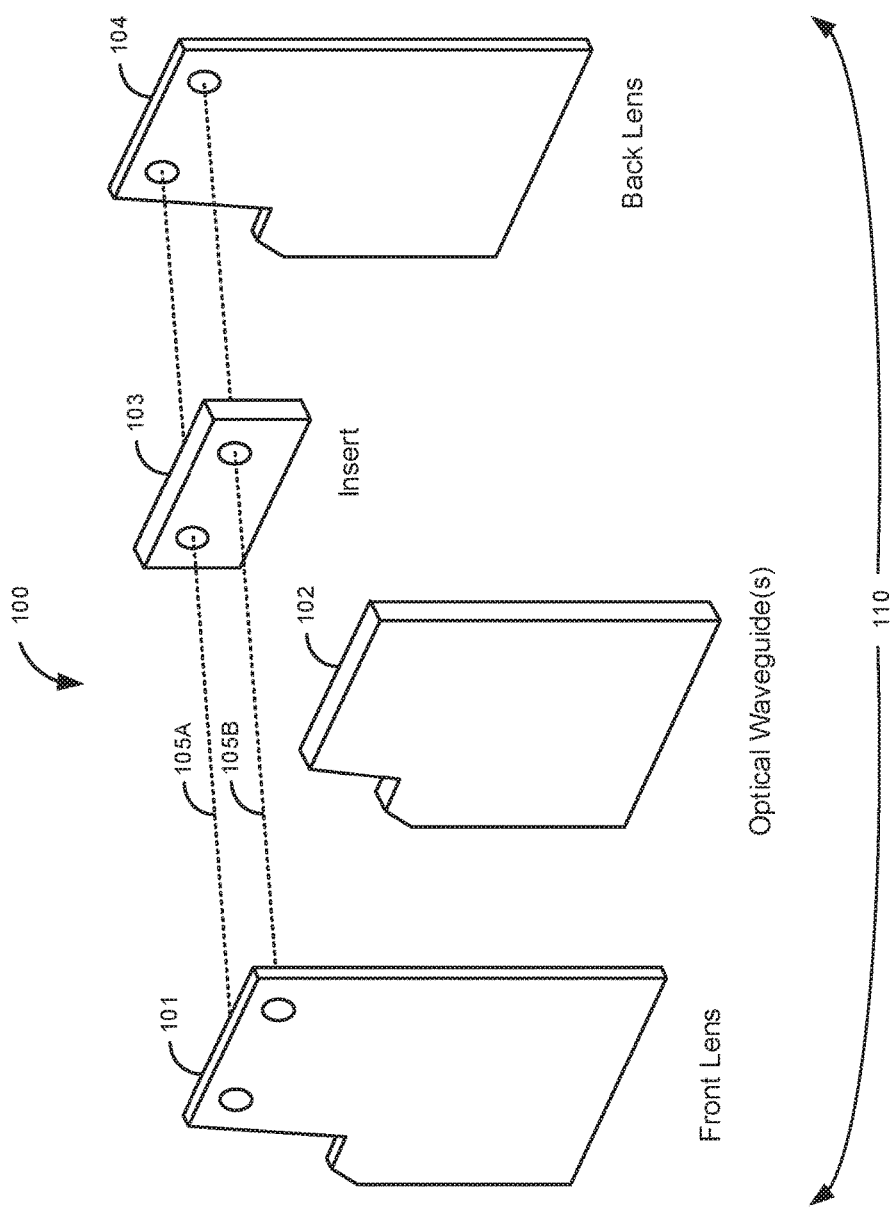
FIG. 1 is a first exemplary embodiment of an optical waveguide assembly in accordance with embodiments of the present disclosure.

FIG. 1 is a first exemplary embodiment 100 of an optical waveguide assembly 110 in accordance with embodiments of the present disclosure. The optical waveguide assembly 110 comprises a front lens 101, optical waveguide(s) 102, an insert 103, and a back lens 104.

Figure 2:
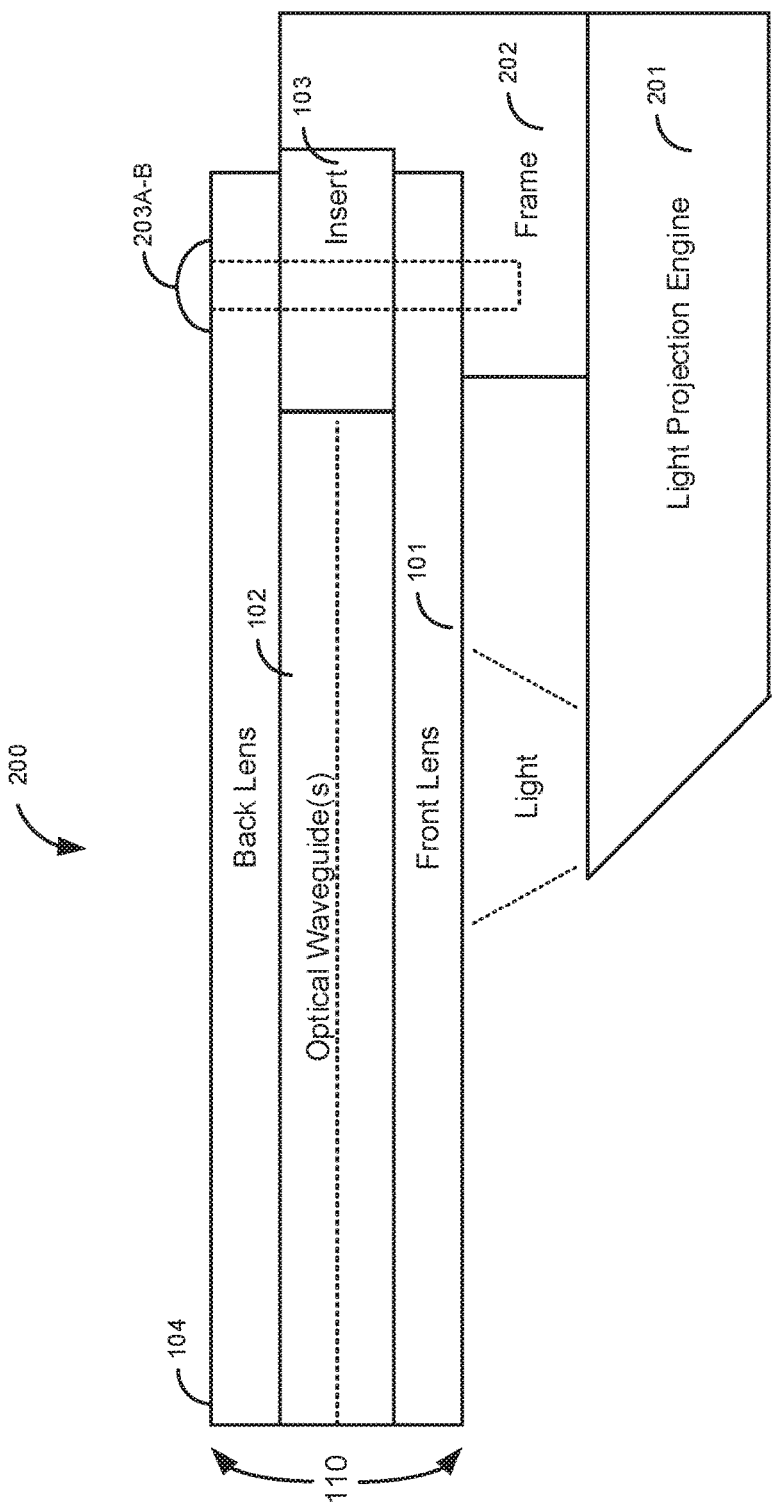
FIG. 2 is an exemplary embodiment of an optical projection system that shows a side view of an optical waveguide assembly that is being used with a light projection engine in accordance with embodiments of the present disclosure.

The front lens 101 is used to receive a projected optical image that is sent from a light projection engine (e.g., light projection engine 201 as shown in FIG. 2). The front lens 101 is used to in conjunction with the back lens 104 to focus the projected image at a prescribed distance from the user. The front lens 101 and the back lens 104 are typically made of a clear plastic material, but can be made of other materials, such as glass or crystal materials.

The optical waveguide(s) 102 are used to take an optical image that is directed from the front lens 101 and propagate the optical image through the optical waveguide(s) 102 to produce a second image to the back lens 104. In one embodiment, the second image that is output from the optical waveguide(s) 102 is a larger version of the optical image that was received from the front lens 101. The optical waveguide(s) 102 may comprise more than one optical waveguide 102. For example, the optical waveguide(s) 102 may comprise a red and a blue optical waveguide 102. The different colors of optical waveguide(s) 102 are used to propagate optical waves for projection to the back lens 104.

The insert 103 is typically a high tolerance component that is used to precisely align the optical waveguide assembly 110 with a frame. The insert may or may not be optically transmissive; stated differently, the insert may be at least substantially opaque. The insert may be made of a variety of materials, such as metal, plastic, ceramic, polymers, and/or the like. The insert 103 is the same width as the width of the optical waveguide(s) 102 (including any applied adhesive/adhesive tape). When discussing the width of the insert 103 in relation to the width of the optical waveguide(s) 102, the width of the insert 103 may vary based on basic manufacturing processes. In other words, the width of the insert 103 in relation to the width of the optical waveguide(s) 102 may vary based on defined manufacturing tolerances. As discussed herein and in the claims having the same width is based on these manufacturing tolerances.

The insert 103 precisely aligns with the optical waveguide(s) 102 and an attached frame to ensure accurate alignment of the optical waveguide assembly 110 so that the projected image is not distorted. The insert 103 reduces the tolerance effect of the front lens 101/back lens 104 (which may be a lower tolerance) to ensure proper alignment with the optical waveguide(s) 102. The insert 103 can have alignment features that ensure precise alignment with highly tolerant surfaces, slots, holes, pins, screws, and/or the like. For example, as shown in FIG. 1, the front lens 101, the insert 103, and the back lens 104 can be tied together using screws/holes as shown by the alignment lines 105A-105B.

The back lens 104 is used to receive an optical image from the optical waveguide(s) 102. The back lens 104 the projects the optical image to a user.

When the optical waveguide assembly 110 is assembled, the front lens 101 is attached to the optical waveguide(s) 102. If the front lens 101 (also the back lens 104) comes in direct contact with the optical waveguide(s) 102, this can cause the optical waveguide(s) 102 to work improperly because it can cause problems with light refraction in the optical waveguide(s) 102. One way to correct this problem is to apply a type of liquid adhesive (e.g., applying a clear liquid adhesive as known in the prior art) between the front lens 101 and the optical waveguide(s) 102. In one embodiment, the front lens 101 is attached to the optical waveguide(s) 102 by applying the clear liquid adhesive along two or more parallel edges of the optical waveguide(s) 102. The clear liquid adhesive is only applied to surfaces that do receive light from a light projection engine 201. The liquid adhesive area may be all or a portion of the area that does not receive light from the light projection engine 201.

In another embodiment, an Optically Clear Adhesive (OCA) tape (e.g., as discussed in FIG. 4) is used instead of the liquid adhesive to adhere the front lens 101 to the optical waveguide(s) 102. The area covered by the OCA tape may be all or a portion of the area that does not receive light from the light projection engine 201.

In another embodiment, the front lens 101 may have a raised edge and/or raised area on the front lens 101 (i.e., on the side that faces the optical waveguide(s) 102) that does not receive light from the light projection engine 201. A uniform adhesive is then applied to the raised edge and/or area to adhere the front lens 101 to the optical waveguide(s) 102. The area of the raised edge and/or raised area on the front lens 101 may be all or a portion of the area that does not receive light from the projection engine 201. For example, the area of the raised edge on the front lens 101 may be on two parallel edges. Alternatively, instead of using edges, a raised area may be in separate areas in corners of the front lens 101. One of skill in the art would clearly recognize that the front lens 101 could have raised edges and/or raised areas in various configurations in the areas that do not receive light from the light projection engine 201. In one embodiment, the raised edge/areas of the front lens 101 do not use an applied adhesive.

In another embodiment, the optical waveguide(s) 102 may have a raised edge and/or raised area that does not receive light from the light projection engine 201 (i.e., one or both sides). A uniform adhesive can then be applied to the raised edge and/or raised area on the optical waveguide(s) 102. In one embodiment the uniform adhesive may not be applied to the raised edge and/or raised area on the optical waveguide(s) 102. In another embodiment, both the front lens 101/back lens 104 and the optical waveguide(s) 102 may have matching (or not matching) raised edges and/or areas.

Likewise, the back lens 104 can be attached in a similar manner (like those discussed above for the front lens 101) to the optical waveguide(s) 102. For example, the back lens 104 can be attached using one or more of liquid adhesive, OCA tape, raised edges (on the back lens 104/optical waveguide(s) 102).

One of skill in the art would understand that different combinations of liquid adhesive, OCA tape, raised edges/ areas on the front lens 101, optical waveguide(s) 102, and/or back lens 104 can be used to create the optical waveguide assembly 110. For example, the front lens 101/back lens 104 may use raised edges/areas with applied adhesive while two optical waveguides 102 may use OCA tape in between the optical waveguides 102.

The insert 103 may or may not use liquid adhesive/OCA tape to be attached to the front lens 101/back lens 104. Having the insert 103 (e.g., a metal or plastic insert 103) in the optical waveguide assembly 110 at the same level as the optical waveguide(s) 102, allows elements (e.g., screws or fasteners) that can tighten the optical waveguide assembly 110 to a frame without cracking the optical waveguides 102, particularly glass or crystal optical waveguides. If the optical waveguide 102/insert 103 was manufactured as a single optical waveguide 102, when the screws are used to tighten down the optical waveguide assembly 110, the optical waveguide 102 may crack. Having a separate insert 103 avoids the problem of cracking an optical waveguide 102 when tightening the optical waveguide 110 assembly to a frame with screws or fasteners.

FIG. 2 is an exemplary embodiment of a light projection system 200 that shows a side view of an optical waveguide assembly 110 that is being used with a light projection engine 201 in accordance with embodiments of the present disclosure. FIG. 2 shows the optical waveguide assembly 110 being attached to a frame 202 via screws 203A-203B.

The light projection engine 201 can be or may include any device that can project an image, such as, a Digital Light Processor (DLP), a projector, a Light Emitting Diode (LED) array, a laser, and/or the like. The light projection engine 201 projects light to the optical waveguide assembly 110. The light projection engine 201 is connected to the frame 202.

The frame 202 is typically a frame 202 of a virtual reality headset. However, in other embodiments, the frame 202 may be attached to other types of projection systems. The frame 202 is attached to the optical waveguide assembly 110 via screws 203A-203B. The frame 202 as shown in FIG. 2 may only be a portion of the frame 202. For example, the frame 202 may include other elements of a virtual reality headset that has an attached second optical waveguide assembly 110.

The screws 203A-203B (one behind the other in FIG. 2) are placed through the holes shown in FIG. 1 in the front lens 101, the insert 103, and the back lens 104. The screws 203A-203B may be other types of elements such as fasteners, bolts, rivets, and/or the like. Because the insert 103 is precisely aligned to the frame 202, a higher precision alignment can be achieved between the light projection engine 201 and the optical waveguide assembly 110.

FIG. 3A shows a frame 202 used to mount an optical waveguide assembly 110 in accordance with embodiments of the present disclosure. The frame 202 has an edge 300 that is placed in the frame 202. The edge 300 defines an edge area 301 that is lower than the rest of the frame 202. The edge 300 is typically a precision edge that aligns with the insert 103 (a precision insert 103).

FIG. 3B shows a frame 202 with a mounted optical waveguide assembly 110 in accordance with embodiments of the present disclosure. In FIG. 3B, the edge 300 precisely aligns with the optical waveguide assembly 110. For example, during manufacturing, the optical waveguide assembly 110 can be aligned to the edge 300 by sliding the optical waveguide assembly 110 in the edge area 301 securely against the edge 300 and the tightening the screws 203A-203B.

FIG. 3C shows a frame 202 with a mounted optical waveguide assembly 110 in accordance with embodiments of the present disclosure. In this embodiment, the frame 202 comprises pins 302A-302B (e.g., a raised attachment element). The pins 302A-302B may be molded/cast as part of the frame 202. Although shown as being circular, the pins 302A-302B may be shaped differently, such as a squire shape, a diamond shape, a star shape, and/or the like. The pins 302A-302B allow the waveguide assembly 110 to be precisely aligned with the frame 202 when the screws 203A-203B are used to attach the optical waveguide assembly 110 to the frame 202. In FIG. 3C the optical waveguide assembly 110 has a notch 303 and a hole 304 at are used align to precisely align the waveguide assembly 110 using the pins 302A-302B.

Figure 4:
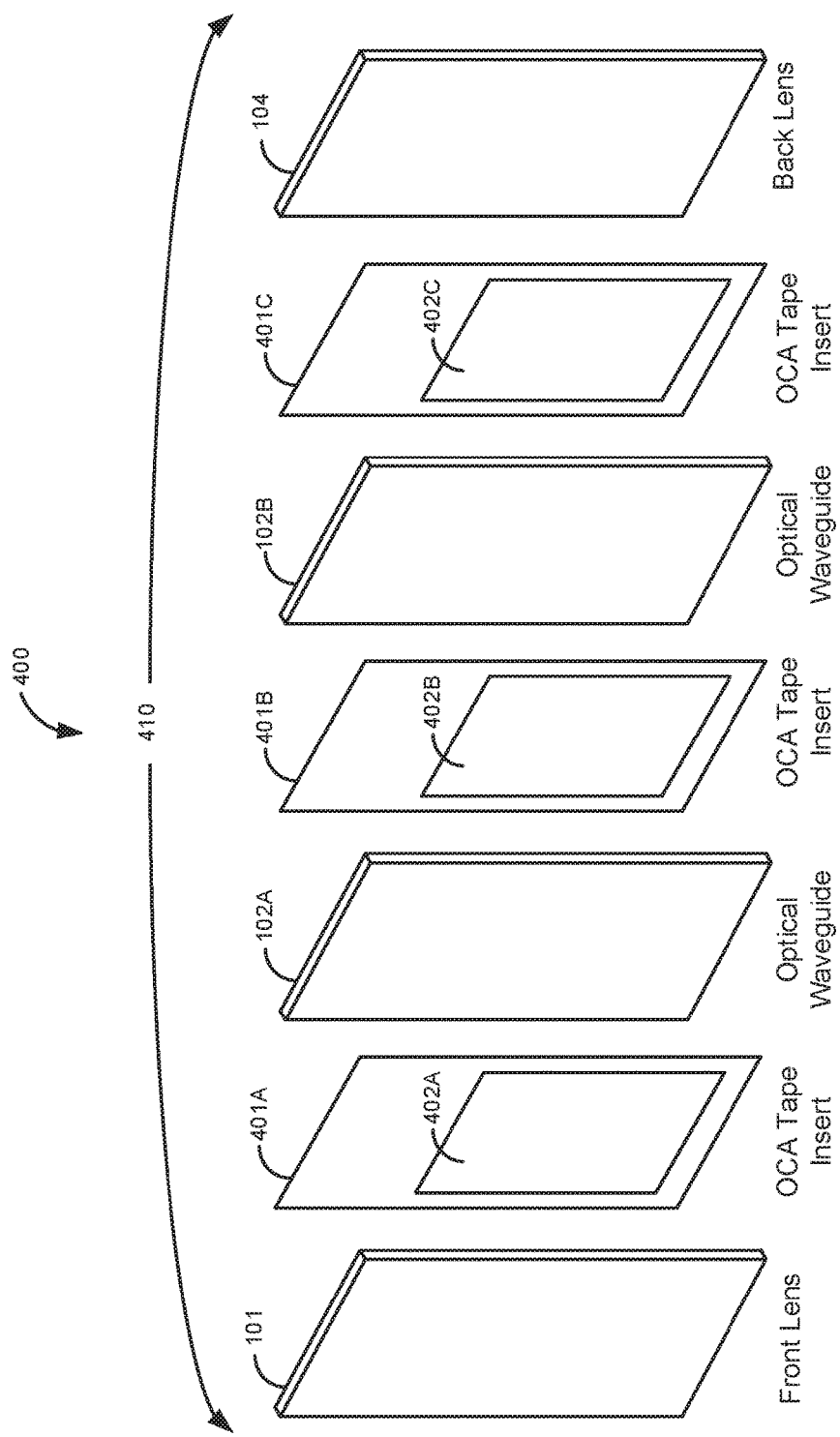
FIG. 4 is a second exemplary embodiment of an optical waveguide assembly in accordance with embodiments of the present disclosure.

FIG. 4 is a second exemplary embodiment 400 of an optical waveguide assembly 410 in accordance with embodiments of the present disclosure. The optical waveguide assembly 410 comprises the front lens 101, an Optically Clear Adhesive (OCA) tape insert 401A, optical the waveguide 102A, an OCA tape insert 401B, the optical waveguide 102B, an OCA tape insert 401C, and the back lens 104. Although the optical waveguide assembly 410 is shown comprising two optical waveguides 102A-102B, the optical waveguide assembly 410 may comprise a single optical waveguide 102A (i.e., not having optical waveguide 102B and OCA tape insert 401C). In one embodiment, more than two optical waveguides 102 (with additional OCA tape inserts 401) may be included in the optical waveguide assembly 410.

The OCA tape inserts 401A-401C further comprise cutout sections 402A-402C. The cutout sections 402A-402C are areas where the OCA tape inserts 401A-401C do not have OCA tape. The cutout areas 402A-402C can be created in various ways, such as by being cutout (e.g., by a laser or cutting tool), by being molded, by being cast, and/or the like. The cutout areas 402A-402C of the OCA tape inserts 401A-401C correspond to areas on the front lens 101, the optical waveguides 102A-102B, and the back lens 104 that do not pass light from the light projection engine 201.

A key advantage of using the OCA tape inserts 401A-401C over liquid adhesive (the prior art) is that the OCA tape inserts 401A-401C ensures a consistent seam from assembly to assembly. The OCA tape inserts 401A-401C also ensures that a consistent air-gap is always maintained between the two surfaces without the need for additional mechanical elements (e.g., additional mechanical fixtures to align the optical waveguides 102A-102B). The OCA tape inserts 401A-401C has a consistent thickness ensuring that the optical waveguide 102A-102B are parallel with each other and to the front lens 101/back lens 104. In contrast, the same levels of alignment are more difficult to achieve using liquid adhesive.

Figure 5:
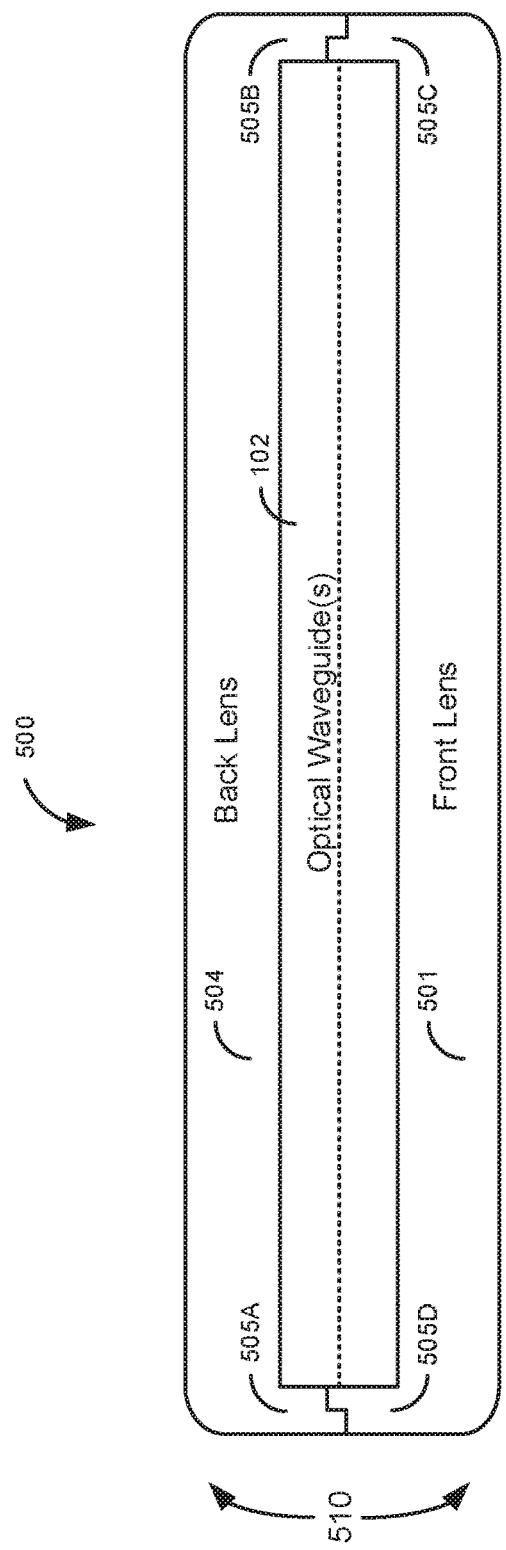
FIG. 5 is a side view of a third exemplary embodiment of an optical waveguide assembly in accordance with embodiments of the present disclosure.

FIG. 5 is a side view of a third exemplary embodiment 500 of an optical waveguide assembly 510 in accordance with embodiments of the present disclosure. The optical waveguide assembly 510 comprises a front lens 501, the optical waveguide(s) 102, and a back lens 504. Although not shown, the optical waveguide assembly 510 may comprise OCA tape inserts 401, liquid adhesive, raised edges/areas in the front lens 501, optical waveguide(s) 102, and/or back lens 504 that are used to bind the different layers of the optical waveguide assembly 510 (e.g., as discussed above). In FIG. 5, the front lens 501 and the back lens 504 include cover portions 505A-505D. The cover portions 505A-505D cover the edges of the optical waveguide(s) 102 to protect the optical waveguide(s) 102 from damage. The edges of optical waveguide(s) 102 are an especially sensitive area of the optical waveguide(s) 102 because the optical waveguides 102 are typically made of glass or crystalline materials. The cover portions 505A-505D prevent the edges of the optical waveguide(s) 102 from being damaged.

In one embodiment, the front lens 501 or the back lens 504 may not have cover portions 505. In this embodiment, only one of the front lens 501 or the back lens 504 has a cover portion that extends to the opposite lens (501 or 504).

Figure 6:
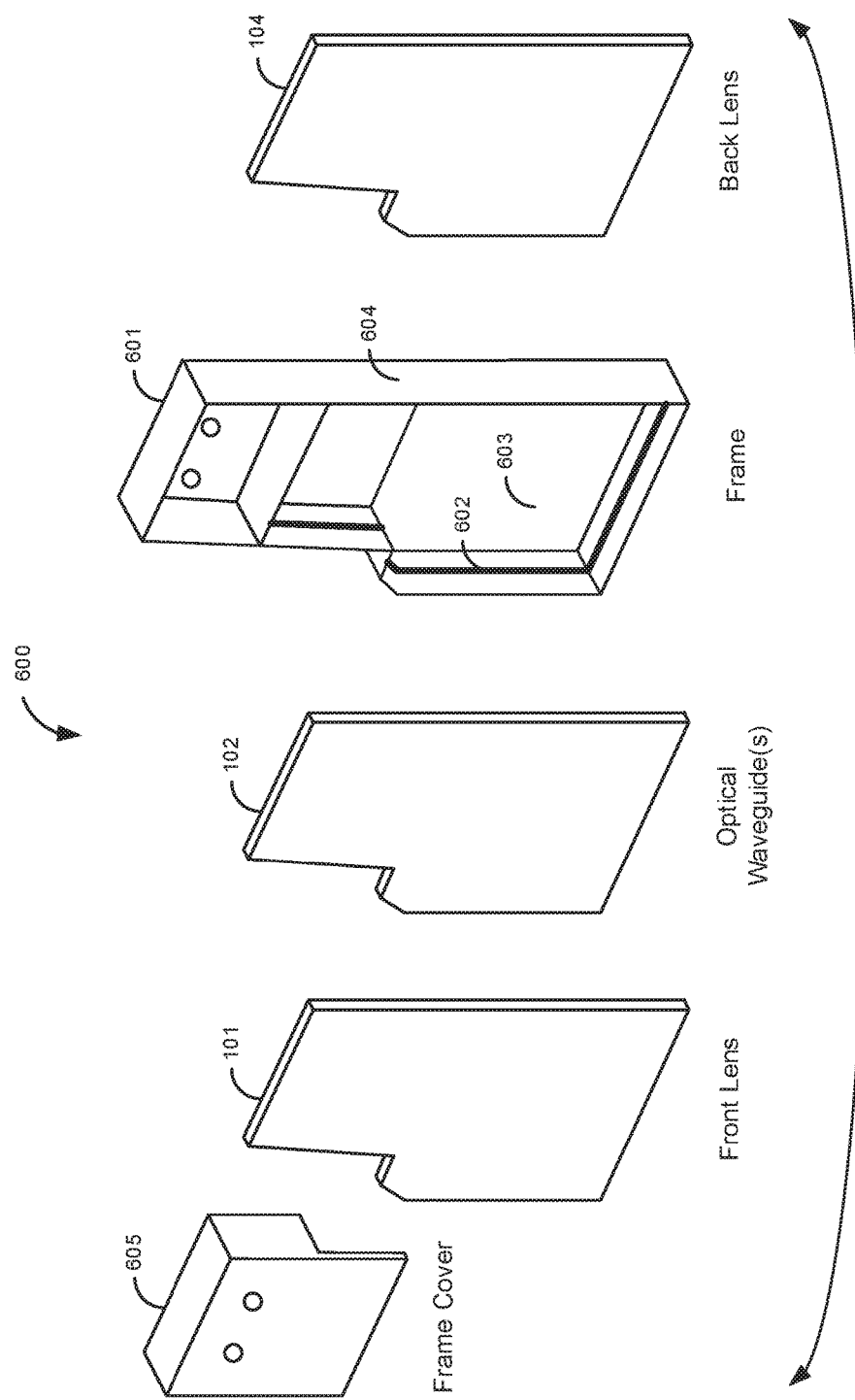
FIG. 6 is a fourth exemplary embodiment of an optical waveguide assembly in accordance with embodiments of the present disclosure.

FIG. 6 is a fourth exemplary embodiment 600 of an optical waveguide assembly 610 in accordance with embodiments of the present disclosure. The optical waveguide assembly 610 comprises a frame cover 605, the front lens 101, the optical waveguide(s) 102, a waveguide frame 601, and the back lens 104. Although not shown, other elements may be used, such as any of the elements discussed above (e.g., an OCA tape insert 401, raised edges/area).

The waveguide frame 601 is a frame that is designed to protect the optical waveguide(s) 102 from damage. The waveguide frame 601 houses the front lens 101, the optical waveguide(s) 102, and the back lens 104. The waveguide frame 601 may further comprise notch 602. The notch 602 separates the optical waveguide(s) 102 from the back lens 104. In one embodiment, the waveguide frame 601 may not include the notch 602.

In one embodiment, the notch 602 may be at the back of the waveguide frame 601. In this embodiment, the front lens 101, the optical waveguide(s) 102, and the back lens all mount to the waveguide frame 601 from the front side of the waveguide frame 601.

The waveguide frame 601 also has an open area 603. The open area 603 allows light to pass from the optical waveguide(s) 102 to the back lens 104 (or from the back lens to the user).

The waveguide frame 601 also has an outside edge 604. The outside edge 604 is to protect the optical waveguide guide(s) 102 (e.g., glass optical waveguide(s) 102) from damage. The optical waveguide assembly 610 is created by inserting the optical waveguide(s) 102, the front lens 101 and the back lens 104 into the waveguide frame 601 and attaching the frame cover 605 (e.g., using screws or fasteners).

Figure 7:
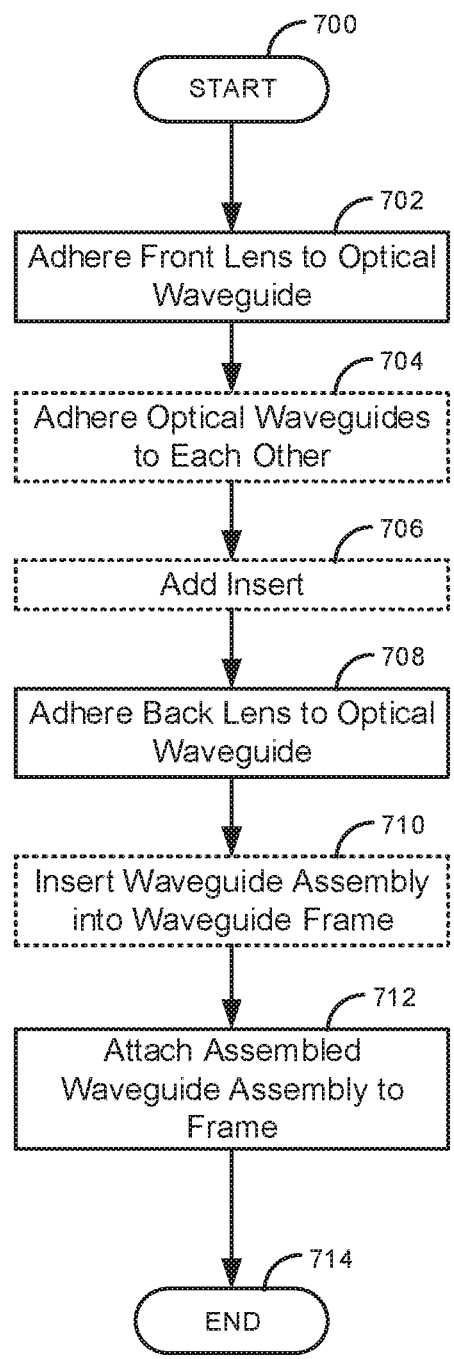
FIG. 7 is a flow diagram of a process for assembling an optical waveguide assembly.

FIG. 7 is a flow diagram of a process for assembling an optical waveguide assembly (e.g. 110, 410, 510, or 610). The process starts in step 700. The front lens 101 (or 501) is attached to an optical waveguide 102 in step 702. As discussed above, the front lens 101/501 can be attached using liquid adhesive, an OCA tape insert 401, where the front lens 101/501 has a raised edge/raised area with applied adhesive, where the optical waveguide 102 has a raised edge/raised area with applied adhesive, and/or the like.

The optical waveguides 102 (if there are two or more optical waveguides 102) are adhered to each other in step 704. This can be accomplished using liquid adhesive, OCA tape insert 401, where the optical waveguide 102 has a raised edge with adhesive, and/or the like. This step is optional (indicated by the dashed lines of step 704) depending if there are more than one optical waveguide 102.

The insert 103 is added in step 706. Adding the insert 103 only applies to the process described in FIG. 1.

The back lens 104 is adhered to the optical waveguide 102 in step 708. As discussed above, the back lens 104/504 can be attached using liquid adhesive, OCA tape insert 401, where the back lens 104/504 has a raised edge/raised area with applied adhesive, where the optical waveguide 102 has a raised edge/raised area with applied adhesive, and/or the like.

The waveguide assembly 610 is inserted into the waveguide frame 601 (applies only to the embodiment described in FIG. 6) in step 710. The waveguide assembly 110, 410, 510, or 610 is then attached to the frame 202 in step 712. The process then ends in step 714.

Any of the steps, functions, and operations discussed herein can be performed continuously and automatically.

The exemplary systems and methods of this disclosure have been described in relation to different kinds of optical waveguide assemblies 110/410/510/610. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include an optical waveguide assembly comprising: a front lens; one or more optical waveguides; a back lens; and an insert, wherein the insert is the same width as the one or more optical waveguides, wherein the insert is at a same level in the optical waveguide assembly as the one or more optical waveguides, and wherein the insert comprises one or more mounting mechanisms for attaching the optical waveguide assembly to a frame.

Aspects of the above further comprise the frame, wherein the frame has an edge that defines a lowered edge area that is used to align the optical waveguide assembly with the frame.

Aspects of the above further comprise the frame, wherein the frame comprises a plurality of raised attachment elements that are used to align the optical waveguide assembly with the frame.

Aspects of the above further comprise wherein the plurality of raised attachment elements comprise two raised pins and the optical waveguide assembly has a notch and a hole that matches the plurality of raised attachment elements.

Aspects of the above further comprise wherein the insert is made of a non-glass or substantially rigid material to prevent cracking of the one or more waveguides.

Aspects of the above further comprise, wherein the one or more glass optical waveguides comprises a plurality of optical waveguides, wherein the insert is the same width and the same level as the plurality of optical waveguides in the optical waveguide assembly.

Embodiments include an optical waveguide assembly comprising: a front lens; one or more optical waveguides; a back lens; and wherein at least one of: the front lens and the back lens comprise a raised edge and/or a raised area that does not receive light from a light projection engine; and the one or more optical waveguides comprise a raised edge and/or raised area that does not receive light from the light projection engine.

Aspects of the above further comprise wherein the optical waveguide assembly comprises the front lens and the back lens that comprise the raised edge and/or the raised area that does not receive light from the light projection engine and wherein the raised edge and/or raised area in the front lens and the back lens have a uniform applied adhesive to attach the front lens and the back lens to the one or more optical waveguides.

Aspects of the above further comprise wherein the optical waveguide assembly comprises the one or more optical waveguides that comprise the raised edge and/or raised area that does not receive light from the light projection engine and wherein the raised edge and/or raised area in the one or more optical waveguides have a uniform applied adhesive to attach the one or more optical waveguides to the front lens and back lens.

Aspects of the above further comprise wherein the one or more optical waveguides comprises a plurality of optical waveguides.

Embodiments include an optical waveguide assembly comprising: a front lens; one or more optical waveguides; a back lens; and two or more Optically Clear Adhesive (OCA) inserts, wherein the two or more OCA inserts each comprise a cutout section that passes light from a light projection engine and wherein the two or more OCA inserts attach the one or more optical waveguides, the front lens, and the back lens to one another.

Aspects of the above further comprise wherein the two or more OCA inserts only attach the one or more optical waveguides, the front lens, and the back lens to one another in areas that do not pass light from the light projection engine.

Aspects of the above further comprise wherein the one or more optical waveguides comprise a plurality of optical waveguides.

Embodiments include an optical waveguide assembly comprising: a front lens; one or more glass optical waveguides; a back lens; and wherein at least one of the front lens or the back has a cover portion that is designed to protect edges of the one or more glass optical waveguides.

Aspects of the above further comprise wherein both the front lens and the back lens have cover portions that are designed to protect the edges of the one or more glass optical waveguides.

Aspects of the above further comprise wherein the front lens or the back lens only has the cover portion that is designed to protect the edges of the one or more glass waveguides.

Embodiments include an optical waveguide assembly comprising: a front lens; one or more glass optical waveguides; a back lens; and a frame, wherein the frame has an outside edge that is used to protect the one or more glass optical waveguides; and a frame cover, wherein the frame cover is used to attach the front lens, the one or more glass optical waveguides and the back lens.

Aspects of the above further comprise wherein the frame further comprise a notch that is used to assemble the optical waveguide assembly.

Aspects of the above further comprise wherein the notch aligns with an area the does not pass light from a light projection engine.

Aspects of the above further comprise wherein the frame cover covers an area of the front lens that does not pass light from a light projection engine.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

An "optical waveguide" is typically a spatially inhomogeneous structure for guiding light, i.e. for restricting the spatial region in which light can propagate. Usually, an optical waveguide contains a region of increased refractive index, compared with the surrounding medium (called cladding). However, guidance is also possible, e.g., by the use of reflections, e.g. at metallic interfaces. Some waveguides also involve plasmonic effects at metals. Many waveguides exhibit two-dimensional guidance, thus restricting the extension of guided light in two dimensions and permitting propagation essentially only in one dimension. An example is a channel waveguide. The most important type of two-dimensional waveguide is an optical fiber. Waveguides can also be one-dimensional waveguides, specifically planar waveguides.

What is claimed is:

1. An optical waveguide assembly comprising:
   a front lens;
   one or more optical waveguides;
   a back lens; and
   an insert, wherein the insert is not optically transmissive, wherein the insert is the same width as the one or more optical waveguides, wherein the insert is adjacent to at least one of the one or more optical waveguides, wherein the one or more optical waveguides and the insert are positioned between the front and back lenses, and wherein the insert comprises one or more mounting mechanisms for attaching the optical waveguide assembly to a frame, wherein the frame has an edge that defines a lowered edge area that is used to align the optical waveguide assembly with the frame.

2. The optical waveguide assembly of claim 1, wherein the insert is made of an at least substantially rigid, non-glass material to prevent cracking of the one or more waveguides.

3. The optical waveguide assembly of claim 1, wherein the one or more optical waveguides comprises a plurality of optical waveguides.

4. The optical waveguide assembly of claim 1, wherein the insert is the same width and a same level in the optical waveguide assembly as the plurality of optical waveguides in the optical waveguide assembly.

5. An optical waveguide assembly comprising:
   a front lens;
   one or more optical waveguides, wherein the one or more optical waveguides comprises a plurality of optical waveguides;
   a back lens; and
   two or more Optically Clear Adhesive (OCA) inserts, wherein the two or more OCA inserts each comprise a cutout section that passes light from a light projection engine and wherein the two or more OCA inserts attach the one or more optical waveguides, the front lens, and the back lens to one another.

6. The optical waveguide assembly of claim 5, wherein the two or more OCA inserts only attach the one or more optical waveguides, the front lens, and the back lens to one another in areas that do not pass light from the light projection engine.

7. The optical waveguide assembly of claim 5, wherein the two or more OCA inserts comprise three or more OCA inserts.

8. The optical waveguide assembly of claim 5, wherein the two or more OCA inserts cause the one or more optical waveguides, the front lens, and the back lens not to touch each other.

9. The optical waveguide assembly of claim 5, wherein the two or more OCA inserts ensures a consistent air gap between the one or more optical waveguides, the front lens, and back lens.

10. An optical waveguide assembly comprising:
    a front lens;
    one or more optical waveguides;
    a back lens; and
    an insert, wherein the insert is substantially opaque, wherein the one or more optical waveguides and the insert are positioned between the front and back lenses, and wherein the insert comprises one or more mounting mechanisms for attaching the optical waveguide assembly to a frame, wherein the frame comprises a plurality of raised attachment elements that are used to align the optical waveguide assembly with the frame, and wherein at least one of the front lens or the back lens has a cover portion that is designed to protect edges of the one or more optical waveguides.

11. The optical waveguide assembly of claim 10, wherein both the front lens and the back lens have cover portions that are designed to protect the edges of the one or more optical waveguides.

12. The optical waveguide assembly of claim 11, wherein the cover portions interlock.

13. The optical waveguide assembly of claim 11, wherein the front lens or the back lens only has the cover portion that is designed to protect the edges of the one or more waveguides.

14. The optical waveguide assembly of claim 10, wherein the plurality of raised attachment elements comprise two raised pins and the optical waveguide assembly has a notch and a hole that matches the plurality of raised attachment elements.

* * * * *